(12) United States Patent
Rogers

(10) Patent No.: US 9,052,165 B1
(45) Date of Patent: Jun. 9, 2015

(54) REMOTELY OPERATED ROBOTIC PLATFORM

(76) Inventor: Christopher Rogers, Louisville, CO (US)

( * ) Notice: Subject to any disclaimer, the term of this patent is extended or adjusted under 35 U.S.C. 154(b) by 221 days.

(21) Appl. No.: 13/543,849

(22) Filed: Jul. 8, 2012

Related U.S. Application Data

(60) Provisional application No. 61/505,963, filed on Jul. 8, 2011.

(51) Int. Cl.
| | | |
|---|---|---|
| *F41H 7/02* | (2006.01) | |
| *B60R 16/00* | (2006.01) | |
| *B60K 6/00* | (2006.01) | |
| *B60K 1/00* | (2006.01) | |

(52) U.S. Cl.
CPC . *F41H 7/02* (2013.01); *B60R 16/00* (2013.01)

(58) Field of Classification Search
CPC ............ F41H 7/02; B60R 16/00; B60K 6/00; B60K 1/00
USPC ........... 701/2; 348/14.01; 89/36.08; 180/9.23
See application file for complete search history.

(56) References Cited

U.S. PATENT DOCUMENTS

| | | | |
|---|---|---|---|
| 5,851,162 A * | 12/1998 | Tether ............................ | 475/150 |
| 6,604,590 B2 * | 8/2003 | Foulk, Jr. ...................... | 180/65.1 |
| 7,011,171 B1 * | 3/2006 | Poulter ........................... | 180/8.2 |
| 7,926,598 B2 * | 4/2011 | Rudakevych ................. | 180/9.32 |
| 7,974,736 B2 * | 7/2011 | Morin et al. ................... | 700/245 |
| 2004/0150267 A1 * | 8/2004 | Ferguson ........................ | 307/70 |
| 2004/0167682 A1 * | 8/2004 | Beck et al. ........................ | 701/3 |
| 2007/0119641 A1 * | 5/2007 | Tien .............................. | 180/68.5 |
| 2008/0017426 A1 * | 1/2008 | Walters et al. ............... | 180/65.2 |
| 2008/0173247 A1 * | 7/2008 | Mainini ......................... | 119/161 |
| 2008/0179115 A1 * | 7/2008 | Ohm et al. .................... | 180/9.21 |
| 2009/0065271 A1 * | 3/2009 | Won .............................. | 180/9.32 |
| 2009/0120273 A1 * | 5/2009 | Eckdahl et al. .............. | 89/36.08 |
| 2011/0045445 A1 * | 2/2011 | Spychalski ..................... | 434/23 |
| 2012/0007937 A1 * | 1/2012 | Hall ............................ | 348/14.01 |

* cited by examiner

*Primary Examiner* — Fadey Jabr
*Assistant Examiner* — Martin Weeks
(74) *Attorney, Agent, or Firm* — Plager Schack LLP

(57) ABSTRACT

A remotely operated robotic platform comprises a base module mechanically coupled to a first wheel and a second wheel. A first motor is electrically coupled to a first motor controller and mechanically coupled to a first wheel. A second motor is electrically coupled to a second motor controller and mechanically coupled to a second wheel in order to provide zero-radius turning. An array of batteries is electrically coupled to a distribution bar and further electrically coupled to the motor controllers in order to provide power to the motors. A canopy is mechanically coupled to the base module where the canopy further comprises a nose section mechanically coupled to a tail section where the nose section and the tail section comprise protective plates in order to allow the remotely operated robotic platform to deflect radar.

3 Claims, 2 Drawing Sheets

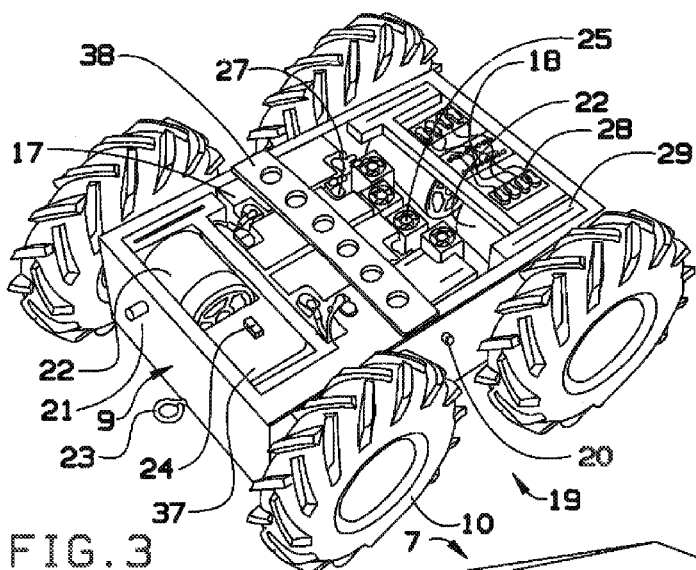
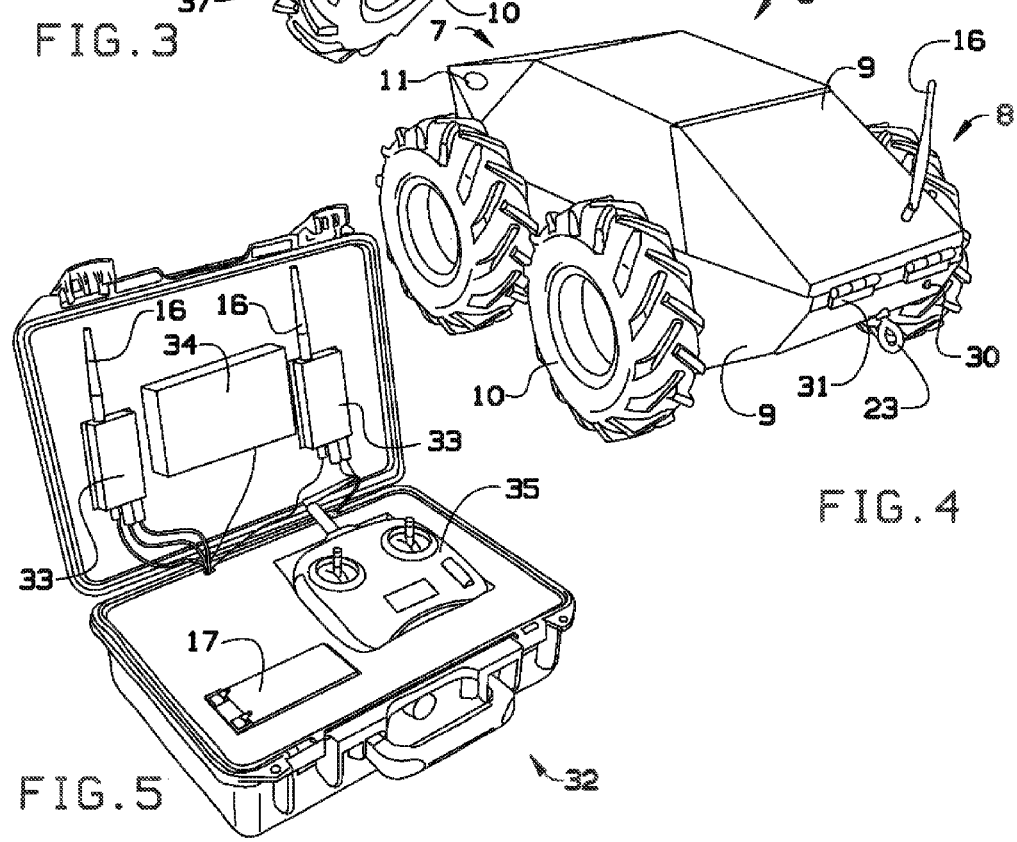

REMOTELY OPERATED ROBOTIC PLATFORM

CROSS REFERENCE TO RELATED APPLICATIONS

This application claims priority to U.S. Provisional Patent application No. 61/505,963 filed on Jul. 8, 2011, which is incorporated by reference.

FIELD OF THE INVENTION

This invention relates to electrical apparatus and corresponding methods to regulate the movement of a vehicle and the vehicles' components or to monitor the operation of a vehicle.

BACKGROUND OF THE INVENTION

Prior art remote controlled vehicles lack the functionality to be reconfigured to perform different kinds of difficult, dangerous or hazardous work, such as searching a rubble pile for survivors of a natural disaster; taking radiation levels after a nuclear catastrophe; breeching a wall of a building where an armed and dangerous terrorist is making bombs; providing security for a high value asset; crawling through a sewage pipeline; or serving a high-risk warrant.

Turning to the prior art, U.S. Pat. No. 7,926,598 issued to Rudakevych teaches a method of using a flipper to navigate obstacles. The present invention utilizes higher torque motors mechanically coupled to a plurality of wheels to accomplish the same end. The present invention uses more motors which are larger and more powerful to handle difficult terrain.

U.S. Pat. No. 7,974,736 issued to Morin teaches a device for discharging a weapon that is attached to a robot. The drivetrain is based on a series of cited prior art references that, even when combined, do not teach the motors which are larger and more powerful to handle difficult terrain.

U.S. Patent Application 2009/0120273 submitted by Eckdahl discloses a remote controlled vehicle for breaching a barrier where the vehicle has a gross vehicle weight of approximately 17,000 pounds. Unsurprisingly, a vehicle that large can breach a boundary and tows other vehicles. The disclosed invention accomplishes the same tasks in a much smaller vehicle which teaches away from Eckdahl's requirement of a large truck.

BRIEF SUMMARY OF THE INVENTION

A remotely operated robotic platform comprises a base module mechanically coupled to a first wheel and a second wheel. A first motor is electrically coupled to a first motor controller and mechanically coupled to a first wheel. A second motor is electrically coupled to a second motor controller and mechanically coupled to a second wheel. When all of the motors on the left side turn in a direction opposite all of the motors on the right side, the remotely operated robotic platform has zero-radius turning. An array of batteries is electrically coupled to a distribution bar and further electrically coupled to the motor controllers in order to provide power to the motors. A canopy is mechanically coupled to the base module where the canopy further comprises a nose section mechanically coupled to a tail section where the nose section and the tail section comprise protective plates in order to allow the remotely operated robotic platform to deflect radar and deflect small arms fire.

BRIEF DESCRIPTION OF THE SEVERAL VIEWS OF THE DRAWINGS

Figure 1:
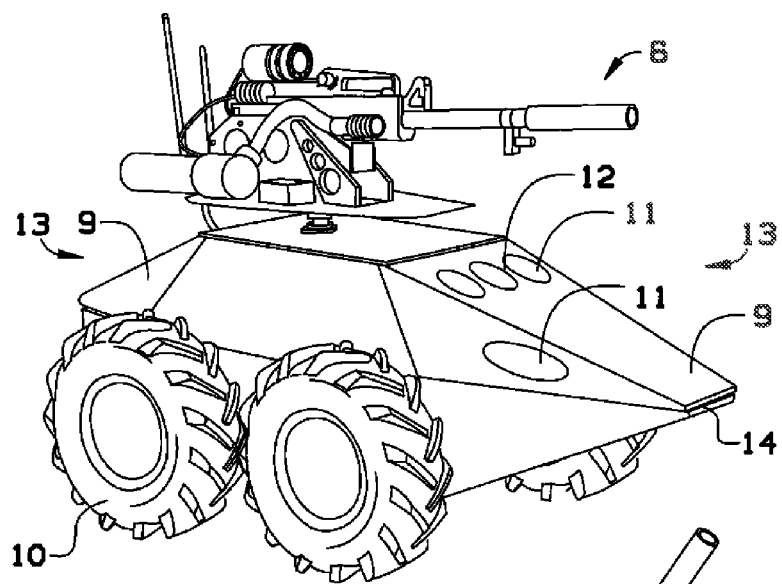

Having thus described the invention in general terms, reference will now be made to the accompanying drawings, which are not necessarily drawn to scale, and wherein:

FIG. 1 is a perspective view of the invention with a non-lethal weapon system attached.

Figure 2:
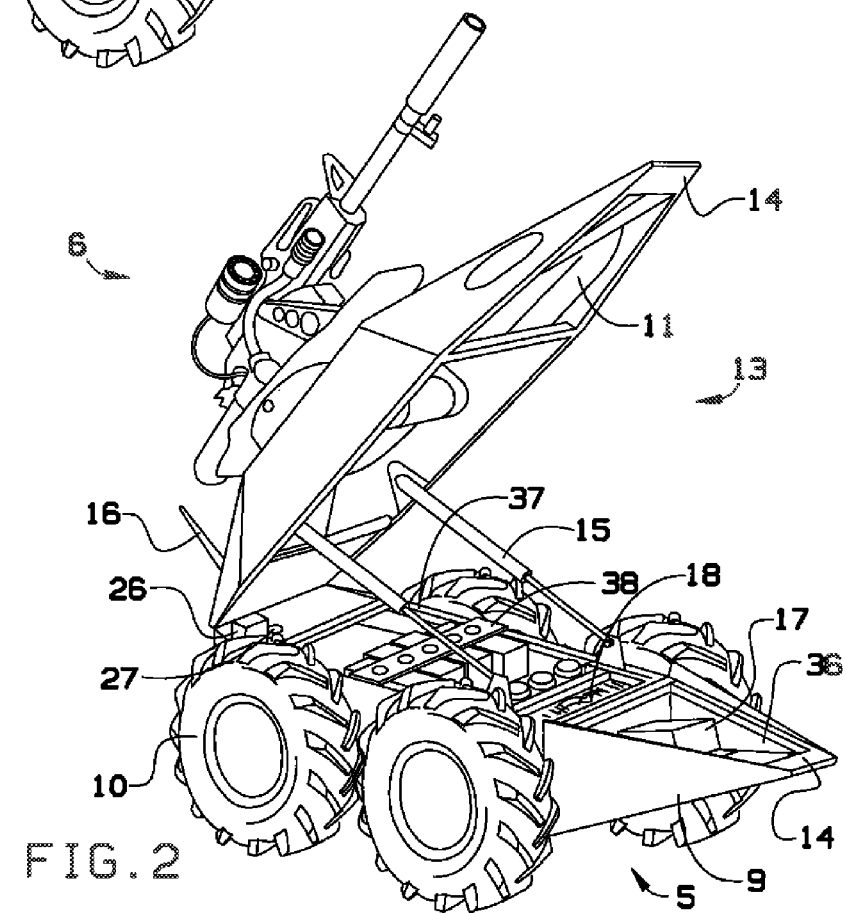

FIG. 2 is a perspective view of the interior with the canopy open.

FIG. 3 is a perspective view of the base module of the invention.

FIG. 4 is a rear perspective view of the invention.

FIG. 5 is a perspective view of the field kit.

DETAILED DESCRIPTION OF THE INVENTION

Embodiments of the present invention overcome many of the obstacles associated with functionality of remote controlled vehicles, and now will be described more fully hereinafter with reference to the accompanying drawings that show some, but not all embodiments of the claimed inventions. Indeed, the invention may be embodied in many different forms and should not be construed as limited to the embodiments set forth herein. Rather, these embodiments are provided so that this disclosure will satisfy applicable legal requirements. Like numbers refer to like elements throughout.

FIG. 1 shows the invention in use. Remotely operated robotic platform 5 is mechanically coupled to non-lethal weapon 6 in a manner explained in U.S. patent application Ser. No. 13/341,656 which is incorporated by reference in its entirety. Of course, non-lethal weapon 6 is not exclusive, rather remotely operated robotic platform 5 can be configured to handle a variety of difficult terrain.

Remotely operated robotic platform 5 comprises canopy 13 mechanically coupled to base module 19 (as shown in FIG. 3) by lock 14. Both canopy 13 and base module 19 comprise a plurality of protective plates 9 which are preferably metal and can be mechanically coupled by welding or by other known metal fasteners. Using other fasteners allows greater access to internal components. Protective plates 9 can be mechanically coupled to lights 11 and camera 12 to allow a remote operator the opportunity to view where remotely operated robotic platform 5 is traveling. Base module 19 is mechanically coupled to wheels 10 as shown in FIG. 3. Of course, a camera 12 or light 11 could be mounted into any protective plate 9 to provide a panoramic field of view which increases the user's situational awareness of remotely operated robotic platform 5 and the ability to drive and operate remotely operated robotic platform 5 as shown below.

FIG. 2 shows remotely operated robotic platform 5 with canopy 13 open. Protective plate 9 of canopy 13 is mechanically coupled to light 11, lock 14, and non-lethal weapon 6 as noted above, and is shown here further mechanically coupled to base module 19 by air lifter 15 and mechanically coupled to antenna 16. Non-lethal weapon 6 is mechanically coupled through a port in canopy 13. The port can receive a replaceable functional module, such as non-lethal weapon 9, that can assist allow the remotely operated robotic platform to perform a variety of tasks. As noted in U.S. patent application Ser. No. 13/341,656, non-lethal weapon 4 can be replaced with any target device such as a paintball gun, sand blaster, flamethrower, fire extinguisher, or grenade launcher, which can then be reattached to the port by fasteners.

Wheels 10 comprise a central hub surrounded by a tire. In some embodiments, the rubber tire can be made of pneumatic or bulletproof material (filled with a semi solid material-to resist punctures). Wheels 10 contact the ground and impart motion to the vehicle by using a special tread pattern depending on the application. Wheels 10 should have the ability to be quickly and easily replaced.

Base module 19 comprises autonomous module 37 mechanically coupled to cargo module 36. Cargo module 36 comprises a plurality of protective plates 9 mechanically coupled to create a cavity that can fit battery 17 and is mechanically coupled to lock 14. Base module 19 is mechanically coupled to distribution bar 18 and battery tie-down 38 as shown in more detail in FIG. 3 Quick release battery module 27 is a way to quickly replace drained batteries 17. Quick release battery module 27 is comprised of a battery carrier with a handle and a quick release electrical connector. Quick release battery module 27 surrounds and supports an array of batteries 17 to make the replacement of the batteries quick and easy. In general, remotely operated robotic platform 5 is remotely controlled, but remotely operated robotic platform 5 can also operate autonomously by running a program with autonomous module 37. Autonomous module 37 is a small circuit board which can send signals to motor controllers 25 causing the invention to move forward reverse, turn or stop.

Communications system 26 is communicatively coupled to audio visual receiver 33 by antenna 16, as discussed in FIG. 5 below.

FIG. 3 shows base module 19 in more detail. Base module 19 comprises chassis 29 mechanically coupled to a plurality of protective plates 9. Radio receiver 24 is communicatively coupled to radio 35, which is further electrically coupled to motor controller 25. Batteries 17 are electrically coupled to motor 22 by motor controller 25 and the power switch 21.

Base module 19 can have a plurality of motors 22 where each motor 22 is located within an opening in chassis 29 with the rotating end of motor 22 facing outward. Each motor 22 is mechanically coupled to a single wheel 10.

Distribution bar 18 is arranged in the following manner, each battery 17 is electrically coupled in series and in parallel through circuit breaker 28. In this manner any or all of batteries 17 can provide power through any or all of the motor controllers 25 depending on where power is needed. Batteries 17 can be electrically coupled to a power source through power access port 20 to charge batteries 17.

Motors 22, motor controllers 25 and wheels 10 can be arranged in a two-wheel drive, four-wheel drive or six-wheel drive configuration among others depending on user preference. By way of example, in an all-wheel drive configuration:

A first motor 22 is electrically coupled to a first motor controller 25 and mechanically coupled to a first wheel 10. A second motor 22 is electrically coupled to a second motor controller 25 and mechanically coupled to a second wheel 10. A third motor 22 is electrically coupled to a third motor controller 25 and mechanically coupled to a third wheel 10. A fourth motor 22 is electrically coupled to a fourth motor controller 25 and mechanically coupled to a fourth wheel 10. In this configuration, base module 19 can rapidly turn by rotating a first set of wheels on the left side in a direction opposite all of a second set of wheels on the right side to allow zero-radius turning. Motor 22 should be a high power high torque motor to allow remotely operated robotic platform 5 to be relatively small (in some embodiments less than 300 pounds) and still strong enough to tow a full sized sport utility vehicle or to break down a door.

The configuration as indicated provides a large number of advantages over the prior art. The use of high torque motors not only adds terrain versatility, but it also allows the invention to be much smaller than conventional robots for these uses, for example, the configuration, as described, is a compact device that can fit through a doorway and weighs about 300 pounds. Also, the high torque motors are substantially more quiet that conventional diesel engines found in the prior art. This, combined with the angular formation of protective plates 9 adds a degree of stealth not found in the prior art.

The strength and weight of the high torque motors allows for a stable machine with a low center of gravity that can be well suited for medical extraction. The modular nature of the components makes reconfiguration quick and easy. The relative simplicity of the system makes the device intuitive to operate, and reduces maintenance. The high torque motors operate in a quiet manner, which is defined here as less than 86 decibels.

FIG. 4 shows a rear view of remotely operated robotic platform 5. Canopy 13 comprises nose section 7 mechanically coupled to tail section 8. Nose section 7 and tail section 8 comprise a plurality of protective plates 9. Tail section 8 is mechanically coupled to base module 19 by hinges 31. Note that protective plates 9 are not directly parallel with the ground, this enables the remotely operated robotic platform 5 to deflect radar and deflect small arms fire because bullets will ricochet off the angled steel plates.

In this configuration, nose section 7 is mechanically coupled to lights 11 and tail section 8 is mechanically coupled to antenna 16. Tail section 8 is further mechanically coupled to tow hook 23 as noted above.

FIG. 5 shows field kit 32 which allows remote control or remote monitoring of remotely operated robotic platform 5. Field kit 32 comprises battery 17 which is electrically coupled to audio-visual receiver 33, monitor 34 and radio 35. Radio 35 is communicatively coupled to motor controllers 25 as noted above. Audio visual receiver 33 is communicatively coupled to antenna 16 and monitor 34. In this manner an audio visual signal from camera 12 is sent through the communication system 26 and antenna 16 to audio visual receiver 33. Of course, this setup is not exclusive, the audio visual signal sent from communication system 26 and wirelessly connected by receiver 33 could be distributed to a large number of monitors 34 making the device networkable.

That which is claimed:

1. A remotely operated robotic platform, comprising:
a base module mechanically coupled to a first set of wheels and a second set of wheels,
wherein a first motor is electrically coupled to a first motor controller and mechanically coupled to the first set of wheels; a second motor electrically coupled to a second motor controller and mechanically coupled to the second set of wheels in order to provide zero-radius turning in a compact device;
wherein the base module further comprises a base module forward portion further comprising a left base module triangle plate angled inward attached to a base module trapezoidal plate angled upward which is further attached to a base module right triangle plate angled inward; wherein the base module is configured to create a surface area permitting pressure to break down a door, wall or barricade;
a quick release battery module comprising a handle and a quick release electrical connector
wherein the quick release electrical connector is electrically coupled to an array of batteries and the handle is mechanically coupled to the array of batteries allowing for the quick and easy replacement of batteries;

wherein the array of batteries is electrically coupled to a distribution bar and further electrically coupled to motor controllers in order to provide power to the motors in a stealthy quiet manner;

a canopy mechanically coupled to the base module where the canopy further comprises a nose section mechanically coupled to a tail section where the nose section and the tail section comprise protective plates in order to allow the remotely operated robotic platform to deflect radar and rounds fired from small arms;

wherein the nose section further comprises a left nose triangle plate angled inward attached to a nose trapezoidal plate angled upward which is further attached to a nose right triangle plate angled inward wherein the nose section is configured to create a surface area permitting greater pressure to break down a door, wall or barricade while configured to deflect radar and small arms fire;

wherein the tail section further comprises a left tail triangle plate angled inward attached to a tail trapezoidal plate angled upward which is further attached to a tail right triangle plate angled inward wherein the tail section is configured to create a surface area that deflects radar and small arms fire; and a replaceable functional module mechanically coupled to the canopy wherein the replaceable functional module is configured to enable the remotely operated robotic platform to perform a variety of tasks.

2. A remotely operated robotic platform, comprising:

a base module mechanically coupled to a first wheel, a second wheel, a third wheel and a fourth wheel, wherein a first motor is electrically coupled to a first motor controller and mechanically coupled to the first wheel; a second motor is electrically coupled to a second motor controller and mechanically coupled to the second wheel; a third motor is electrically coupled to a third motor controller and mechanically coupled to the third wheel; a fourth motor is electrically coupled to a fourth motor controller and mechanically coupled to the fourth wheel to enable an all-wheel drive configuration which can better handle difficult terrain;

wherein the base module further comprises a base module forward portion further comprising a left base module triangle plate angled inward attached to a base module trapezoidal plate angled upward which is further attached to a base module right triangle plate angled inward; wherein the base module is configured to create a surface area permitting pressure to break down a door, wall or barricade;

a quick release battery module comprising a handle and a quick release electrical connector;

wherein the quick release electrical connector is electrically coupled to an array of batteries and the handle is mechanically coupled to the array of batteries allowing for the quick and easy replacement of batteries;

the array of batteries is electrically coupled to a distribution bar and further electrically coupled to motor controllers in order to provide power to the motors in a quiet manner;

a canopy mechanically coupled to the base module where the canopy further comprises a nose section mechanically coupled to a tail section where the nose section and the tail section comprise protective plates in order to allow the remotely operated robotic platform to deflect radar;

wherein the nose section further comprises a left nose triangle plate angled inward attached to a nose trapezoidal plate angled upward which is further attached to a nose right triangle plate angled inward wherein the nose section is configured to create a surface area permitting pressure to break down a door, wall or barricade while configured to deflect radar and small arms fire;

wherein the tail section further comprises a left tail triangle plate angled inward attached to a tail trapezoidal plate angled upward which is further attached to a tail right triangle plate angled inward wherein the tail section is configured to create a surface area that deflects radar and small arms fire; and a replaceable functional module mechanically coupled to the canopy wherein the replaceable functional module is configured to enable the remotely operated robotic platform to perform a variety of tasks.

3. The remotely operated robotic platform of claim 2, the first motor controller and the second motor controller are communicatively coupled to a radio to enable remote control of the remotely operated robotic platform.

* * * * *